United States Patent
Provencher et al.

(10) Patent No.: US 6,639,910 B1
(45) Date of Patent: Oct. 28, 2003

(54) FUNCTIONAL SEPARATION OF INTERNAL AND EXTERNAL CONTROLS IN NETWORK DEVICES

(75) Inventors: Roland T. Provencher, Hudson, NH (US); Brian Branscomb, Hopkinton, MA (US); Nicholas A. Langrind, Carlisle, MA (US); Peter B. Everdell, Littleton, MA (US)

(73) Assignee: Equipe Communications Corporation, Acton, MA (US)

( * ) Notice: Subject to any disclaimer, the term of this patent is extended or adjusted under 35 U.S.C. 154(b) by 0 days.

(21) Appl. No.: 09/574,343

(22) Filed: May 20, 2000

(51) Int. Cl.[7] ............................................. H04L 12/28
(52) U.S. Cl. ...................................... 370/351; 370/254
(58) Field of Search ................................ 370/423, 465, 370/401, 400, 402, 403, 404, 405, 406, 408, 424, 445, 447, 461, 462, 440, 439, 254, 255, 258, 455, 466, 451, 428, 429, 412, 407, 473, 474, 476, 425, 381, 374, 352, 252

(56) References Cited

U.S. PATENT DOCUMENTS

| | | | |
|---|---|---|---|
| 4,716,585 A | * 12/1987 | Tompkins et al. | 379/202.01 |
| 4,750,136 A | 6/1988 | Arpin et al. | 364/514 |
| 4,942,540 A | 7/1990 | Black et al. | 364/514 |
| 5,515,403 A | 5/1996 | Sloan et al. | 375/371 |
| 5,528,746 A | * 6/1996 | Yumine et al. | 345/840 |
| 5,604,867 A | * 2/1997 | Harwood | 395/200.13 |
| 5,638,410 A | 6/1997 | Kuddes | 375/357 |
| 5,726,607 A | 3/1998 | Brede et al. | 331/2 |
| 5,850,399 A | 12/1998 | Ganmukhi et al. | 370/412 |
| 5,903,564 A | 5/1999 | Ganmukhi et al. | 370/399 |
| 5,905,730 A | 5/1999 | Yang et al. | 370/429 |
| 5,926,463 A | 7/1999 | Ahearn et al. | 370/254 |
| 5,953,314 A | 9/1999 | Ganmukhi et al. | 370/220 |

(List continued on next page.)

FOREIGN PATENT DOCUMENTS

| | | |
|---|---|---|
| WO | 9826611 | 6/1998 |
| WO | 9905826 | 2/1999 |
| WO | 9911095 | 3/1999 |
| WO | 9914876 | 3/1999 |
| WO | 9927688 | 6/1999 |
| WO | 9930530 | 6/1999 |
| WO | 9935577 | 7/1999 |

OTHER PUBLICATIONS

"Start Here: Basics and Installation of Microsoft Windows NT Workstation," product literature (1998).

(List continued on next page.)

Primary Examiner—Dang Ton
(74) Attorney, Agent, or Firm—Thomas J. Engellenner; Reza Mollaaghababa; Nutter, McClennen & Fish LLP

(57) ABSTRACT

The present invention provides a network device, such as a network switch or a router, having a high degree of modularity and reliability. The network device includes a data plane and a control plane. The data plane relays datagrams between a pair of receive and transmit network interface ports. The control plane runs management and control operations, such as routing and policing algorithms which provide the data plane with instructions on how to relay cell/packets/frames. Further, the control plane includes an internal control device that is primarily responsible for managing the internal resources of the network device, and a separate external control device that is primarily responsible for operations relating to the interfacing of the network device with an external environment.

20 Claims, 7 Drawing Sheets

U.S. PATENT DOCUMENTS

| | | | | |
|---|---|---|---|---|
| 5,991,163 | A | 11/1999 | Marconi et al. | 361/788 |
| 5,991,297 | A | 11/1999 | Palnati et al. | 370/389 |
| 5,995,511 | A | 11/1999 | Zhou et al. | 370/412 |
| 6,008,805 | A | 12/1999 | Land et al. | 345/335 |
| 6,008,995 | A | 12/1999 | Pusateri et al. | 361/796 |
| 6,015,300 | A | 1/2000 | Schmidt, Jr. et al. | 439/61 |
| 6,021,116 | A | 2/2000 | Chiussi et al. | 370/236 |
| 6,021,263 | A | 2/2000 | Kujoory et al. | 395/200.62 |
| 6,033,259 | A | 3/2000 | Daoud | 439/573 |
| 6,041,307 | A | 3/2000 | Ahuja et al. | 705/8 |
| 6,044,540 | A | 4/2000 | Fontana | 29/505 |
| 6,078,595 | A | 6/2000 | Jones et al. | 370/503 |
| 6,175,571 | B1 * | 1/2001 | Haddock et al. | 370/423 |
| 6,356,544 | B1 * | 3/2002 | O'Connor | 370/353 |

OTHER PUBLICATIONS

"The Abatis Network Services Contractor," Abatis Systems Corporation product literature, 1999.

AtiMe–3E Data Sheet, 1–17 (Mar. 8, 2000).

Black, D., "Building Switched Networks," pp. 85–267.

Black, D., "Managing Switched Local Area Networks A Practical Guide" pp. 324–329.

"Configuration," Cisco Systems Inc. webpage, pp. 1–32 (Sep. 20, 1999).

Leroux, P., "The New Business Imperative: Achieving Shorter Development Cycles while Improving Product Quality," QNX Software Systems Ltd. webpage, (1999).

NavisXtend Accounting Server, Ascend Communications, Inc. product information (1997).

NavisXtend Fault Server, Ascend Communications, Inc. product information (1997).

NavisXtend Provisioning Server, Ascend Communications, Inc. product information (1997).

Network Health LAN/WAN Report Guide, pp. 1–23.

"Optimizing Routing Software for Reliable Internet Growth," JUNOS product literature (1998).

PMC–Sierra, Inc. website (Mar. 24, 2000).

Raddalgoda, M., "Failure–proof Telecommunications Products: Changing Expectations About Networking Reliability with Microkernel RTOS Technology," QNX Software Systems Ltd. webpage, (1999).

"Real–time Embedded Database Fault Tolerance on Two Single–board Computers," Polyhedra, Inc. product literature.

Syndesis Limited product literature, 1999.

"Using Polyhedra for a Wireless Roaming Call Management System," Polyhedra, Inc., (prior to May 20, 2000).

Veritas Software Corporation webpage, 2000.

* cited by examiner

FUNCTIONAL SEPARATION OF INTERNAL AND EXTERNAL CONTROLS IN NETWORK DEVICES

BACKGROUND

This invention relates to network devices, and more particularly, to network devices such as data switches and routers.

Telecommunications networks transmit a large amount of data between various parties, such as businesses, governmental agencies and universities everyday. The increased dependence of various sectors of society on such networks can result in significant disruptions in case of an outage. Mitigation of network downtime is a constant battle for service providers. In particular, service providers strive to minimize network outages due to equipment (i.e., hardware) and all too common software failures.

Traditional networks can experience outages for a variety of reasons. Service providers not only incur downtime due to failures, but also incur downtime for upgrades to deploy new or improved software and hardware, or to deploy software or hardware fixes or patches to deal with particular network problems. A network outage can also occur after an upgrade has been installed if the upgrade itself includes undetected problems or if the upgrade causes other software or hardware to have problems. Downtime may also occur unexpectedly days after an upgrade due to lurking software or hardware incompatibilities. Such outages can result in significant loss of productivity and financial losses.

SUMMARY OF THE INVENTION

The present invention provides a network device, such as a switch or a router or a hybrid switch-router, that ensures high availability and reliability, minimizes the probability of a network outage and allows for reliable and efficient software and hardware upgrades. The computer network device includes a plurality of subsystems for transmitting data between a receiving port and a transmitting port. An internal control device that is in communication with these subsystems manages the internal resources and events within the device. An external control device that is in communication with the internal control device and the subsystems manages operations relating to interfacing of the network device with an external environment. The internal control device and the external control device have separate processor subsystems, and hence do not need to share processing cycles.

In a related aspect, a network device of the invention includes a data plane for transmitting data between a receiving port and a transmitting port, and a control plane in communication with the data plane for managing the internal components and events and external network protocols and events and for interfacing the device with an external environment. The term external environment as used herein refers to other devices with which a network device communicates. Such external devices can, for example, include switches, routers, computer systems, etc. The control plane includes an internal control device for managing the internal resources and events within the device and an external control device for managing operations relating to interfacing of the network device with an external environment. The internal control device and the external control device include separate processor subsystems, and hence do not need to share processing cycles. This allows a more reliable operation of the network device, as described in more detail below.

In one aspect of the invention, the network device can include a message based communication bus, such as Ethernet, token ring, or any proprietary bus, for providing communication between the internal control device and the external control device, and also between the internal and external control devices and subsystems within the data plane. Such a communication bus can also allow the subsystems within the data plane to communication with each other.

In one embodiment, the communication bus includes an Ethernet bus and the internal control device employs an Ethernet switch to communicate with other devices and subsystems of the network device. The internal control device communicates with various subsystems of the network device in order to manage the internal resources of the device and internal events within the device. For example, the internal control device can detect faults and initiate fail-overs to redundant hardware or restart software processes, detect newly added hardware within the device, configure and re-configure hardware and software within the device, upgrade and downgrade software processes, provide fault analysis of selected subsystems of the network device, and gather data relevant to network accounting and statistics.

The Ethernet switch also allows the external control device to communicate with the various subsystems in the data plane to receive network protocol control payloads, for example, Private Network-to-Network Interface (PNNI), Open Shortest Path First (OSPF), and Border Gateway Protocol (BGP), to allow the external control device to set up and tear down network connections through the device (e.g., virtual circuits and virtual paths). The external control device also monitors selected attributes of the external environment with which the network device is interfaced. For example, when the external environment is a network of computers, the external control device monitors the topology/configuration of the external network, and the external network traffic.

In another aspect of the invention, the data received and transmitted by the network device of the invention is optical data formatted as Synchronous Optical Network (SONET) frames. Ethernet interfaces are also prevalent. The data plane receives the SONET frames, transforms them into cells or packets according to a particular network protocol, for example, Asynchronous Transfer Mode (ATM), Internet Protocol (IP), Frame Relay (FR) or Multi-Protocol Label Switching (MPLS), re-assembles the cells or packet into SONET frames, and transmits the re-assembled SONET frames to selected destinations in the external environment.

In another aspect of the invention, the data received and transmitted by the network device of the invention is electrical data provided on an Ethernet bus. The data plane receives data from the Ethernet bus, transforms it into cells or packets according to a particular network protocol, for example, ATM, IP, FR, or MPLS, re-assembles the data, and transmits the data to selected destinations in an external environment.

In one aspect of the invention, the data plane includes a physical connection subsystem that includes an interface logic for receiving a payload of data from the physical layer, e.g., SONET interface logic receives SONET frames carried on an optical fiber. The physical connection subsystem provides limited processing of the received payload before transmitting it to a cross-connect subsystem. For example, the physical connection subsystem can parse the location of the user data within each SONET frame.

The cross-connect subsystem routes or switches the data received from the physical connection subsystem to a forwarding subsystem. The forwarding subsystem transforms the data into cells, frames or packets based on the network protocol employed. For example, the forwarding subsystem can transform the SONET frames or Ethernet data into a stream of ATM cells. Alternatively, the forwarding subsystem can transform SONET frames or Ethernet data into a stream of Internet Protocol (IP) or Multi-Protocol Label Switching (MPLS) packets. The forwarding subsystem employs an interface to communicate with a switching fabric that receives the cells, frames or the packets and routes or switches them to a number of egress subsystems.

The egress subsystems can include forwarding subsystems in communication with physical connection subsystems via one or more cross-connect subsystems. These egress subsystems re-assemble the cells, frames or packets into, for example, SONET frames or Ethernet data, and transmit the frames or data to designated destinations in the external environment.

Illustrative embodiments of the network device of the invention will be described below with reference to the following drawings.

DETAILED DESCRIPTION

The present invention provides a computer network device (e.g., router, switch) having a high degree of modularity and reliability. The high degree of modularity of the network device advantageously allows decoupling of the management of the internal control functions of the device from the external control functions, as described more fully below. The device of the invention can be utilized, for example, as a switching node in a computer network to route/switch data to other nodes of the network.

Figure 1:
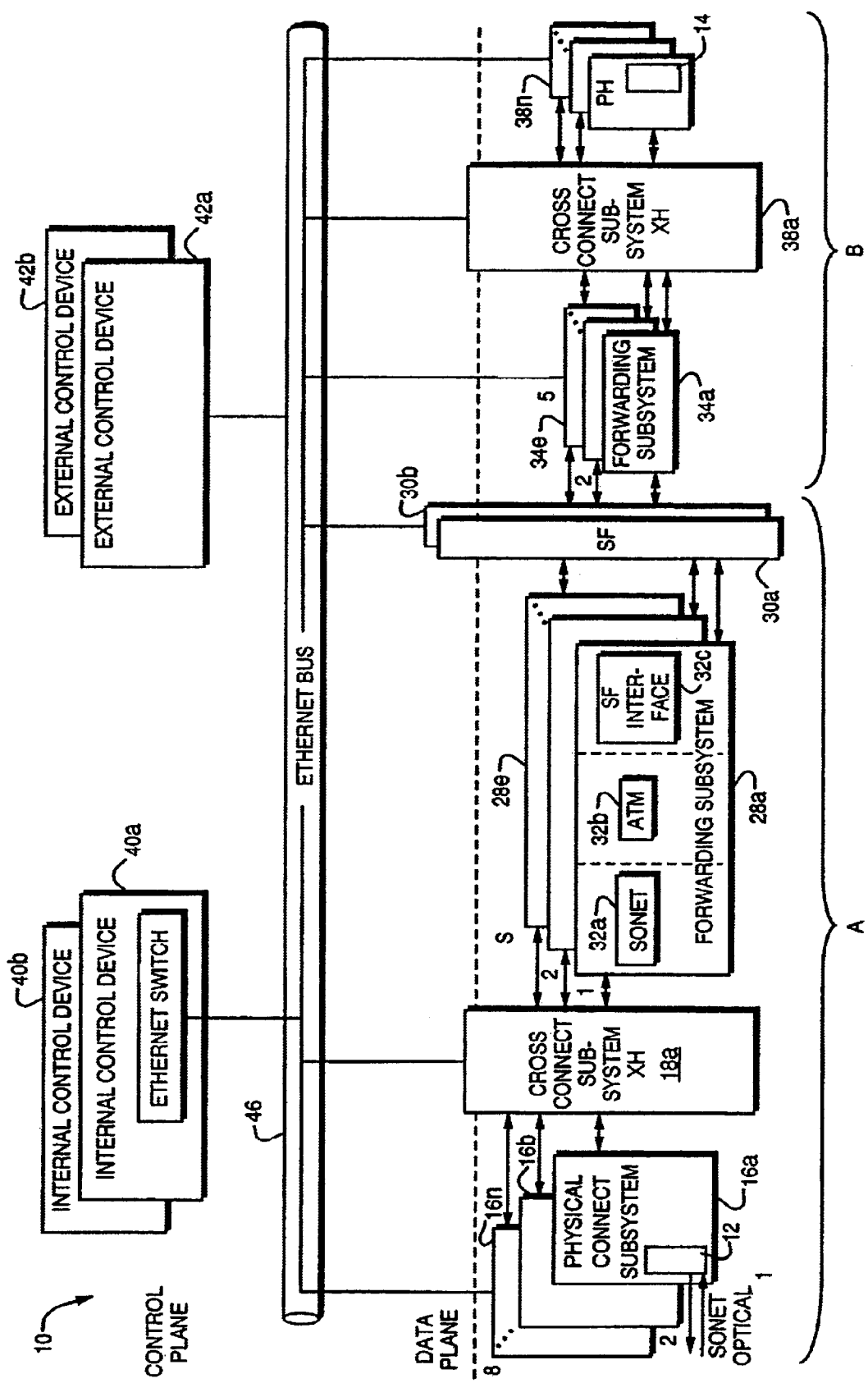
FIG. 1 is a diagram schematically depicting various subsystems of a network device.

FIG. 1 illustrates schematically an exemplary network device 10 in accord with the teachings of the invention having a data plane and a control plane. The data plane of the device 10 relays datagrams between a pair of receive and transmit network interface ports, such as ports 12 and 14. The control plane runs management and control operations, such as routing and policing algorithms which provide the data plane with instructions on how to relay cells/packets/frames. In some traditional switches, architectural components corresponding to the data plane and the control plane are implemented on the same processor subsystem, thus rendering the distinction between the data plane and the control plane purely logical.

In contrast, the device 10 of the invention provides a physical separation between the data plane and the control plane to provide a more stable architecture. That is, the control plane and the data plane have separate processor subsystems that do not share processing cycles. Such a device architecture can be implemented by employing either monolithic or modular software architecture. Software modularity involves functionally dividing a software system into individual modules or processes, which are then designed and implemented independently. Inter-process communication (IPC) between the modules is carried out through a message passing in accordance with well-defined application programming interfaces (APIs). A protected memory feature also helps enforce the physical separation of modules.

The control plane and the data plane are not, however, completely isolated. In particular, at least an interface connects the data plane with the control plane to allow communication therebetween.

The illustrative data plane receives and transmits data through ports 12 and 14. Each port 12 and 14 can function as both a receiving port and a transmission port. Further, the data plane includes a number of subsystems that can function both as ingress and egress components. In this illustrative example, the port 12 operates as a receiving port to receive a stream of data, subsystems A function as ingress components, the port 14 as a transmitting port to transmit a stream of data, and subsystems B function as egress components. The ingress components are responsible for receiving the incoming data, processing it, and transmitting the processed data to the egress components. The egress components are responsible for re-assembling the processed data and transmitting it to the outside world, e.g., other switches in a computer network. It should be clear that each subsystem designated as an ingress component in this illustrative example can also function as an egress component. Similarly, each subsystem designated as an egress component can also function as an ingress component. That is, each subsystem supports a two-way data traffic.

In this illustrative example, a physical connection subsystem 16a in the data plane receives a payload of data from the physical layer. In one embodiment, the physical layer is an optical fiber carrying an OC-48 SONET stream. An OC-48 SONET stream may include connections to one or more network endpoints corresponding to one or more different paths within the SONET stream. A SONET fiber carries a time division multiplexed (TDM) byte stream of aggregated time slots (TS). A time slot has a bandwidth of 51 Mbps and is the fundamental unit of bandwidth for SONET. An STS-1 path has one time slot within the byte stream dedicated to it, while an STS-3c path (i.e., three concatenated STS-1s) has three time slots within the byte stream dedicated to it. The same or different protocols may be carried over different paths within the same TDM byte stream. In other words, ATM over SONET may be carried on an STS-1 path within a TDM byte stream that also includes IP over SONET on another STS-1 path or on an STS-3c path.

The physical connection subsystem 16a transmits the data to a cross connect interface subsystem 18a for transmission to the other processing subsystems of the device. The illustrative physical connection sub-system 16a has a dedicated processor. Further, the physical connection subsystem 16a is preferably equipped with SONET interface logic which allows reception and transmission of SONET data frames, typically at a rate up to approximately 10 Gbps, through the ports of the physical connection subsystem 16a, such as the port 12. Thus, the physical connection subsystem 16a functions as an optical-to-electrical interface for transforming optical data received at its ports to electrical signals to be transmitted to other processing subsystems of the device or vice versa. In particular, the physical connection subsystem 16a transmits the electrical signals corresponding to the received SONET data frames to the cross-connect interface subsystem 18a.

The data plane can include one physical connection subsystem. Alternatively, the data plane can include more than one physical connection subsystem. For example, the data plane can include two physical connection subsystems to provide some redundancy in case the primary physical connection subsystem is down and/or to split the processing of the incoming or outgoing data between the two physical connection subsystems. One preferred embodiment of the invention includes 32 physical connection subsystems, distributed among four quadrants each having 8 physical connection subsystems. In this illustrative example, physical connection subsystems 16a B 16h illustrate the eight subsystems in one such quadrant.

Figure 2A:
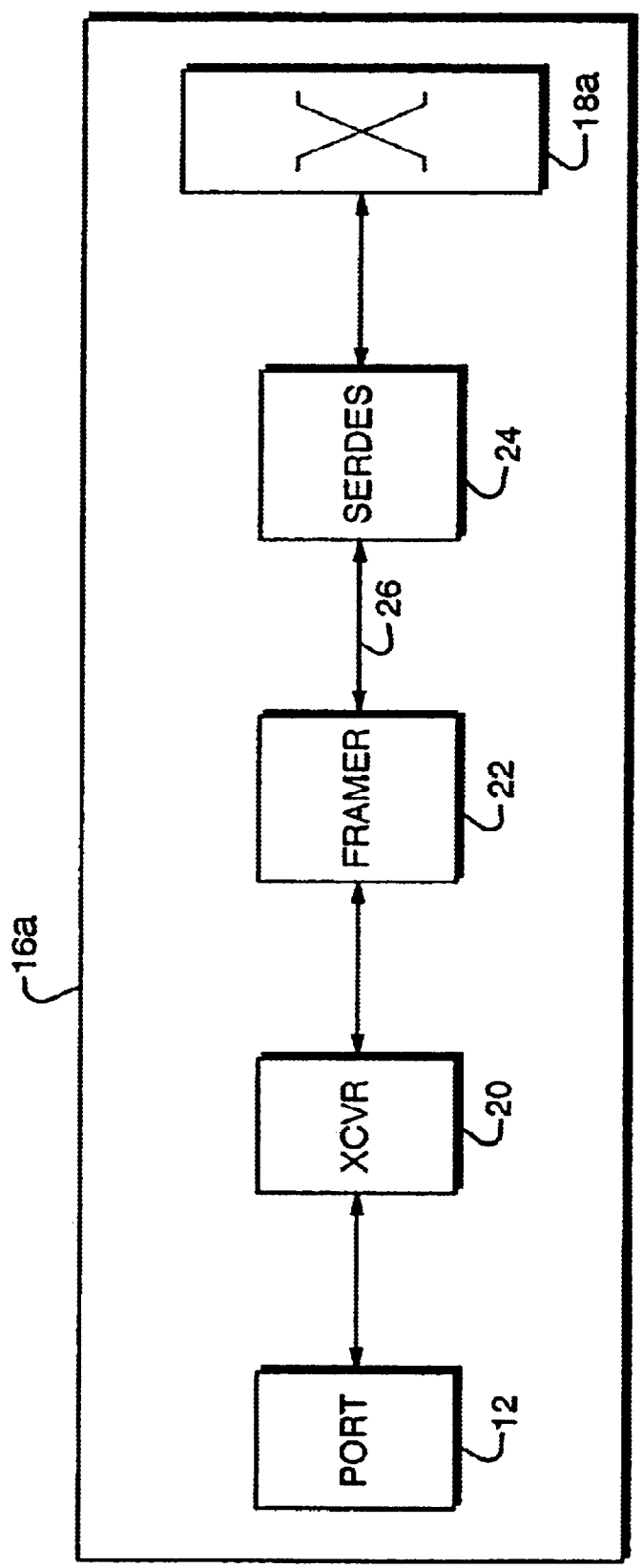
FIG. 2A is a diagram schematically depicting various components of a physical connection subsystem of the network device of FIG. 1.

With reference to FIG. 2A, the physical connection subsystem 16a includes a transceiver 20 that receives the optical data from the port 12 and transforms the optical data to electrical signals. In a case where the port 12 acts as a transmitting port, the transceiver transforms electrical signals to optical data to be sent to the outside world. The electrical signals are transmitted to a SONET framer 22 that organizes the data into SONET frames, and transmits the data over a telecommunications bus 26 to a serializer-deserializer (SERDES) chip 24 that serializes the data into four serial lines, each having twelve STS-1 time slots, and transmits the four serial lines to the cross-connect subsystem 18a.

Referring again to FIG. 1, the cross-connect subsystem 18a is a switch that can provide serial line connections between physical connection subsystems and the forwarding subsystems. In particular, the cross-connect subsystem 18a is programmed to transfer each serial line from any of the physical connection subsystems 16a–16h to one serial line input on any one of a plurality of five forwarding subsystems 28a–28e. Although in this illustrative example, the cross-connect subsystem 18a transmits the data received from the physical connection subsystem 16a to the forwarding subsystem 28a, the cross-connect subsystem 18a can route/switch the data from the physical connection subsystem 16a to any of the forwarding subsystems 28a–28e. Further, the cross-connect subsystem 18a can transmit data received from a plurality of physical connection subsystems to a particular forwarding subsystem. Moreover, the cross-connect subsystem 18a can route the data back to one of the physical connection subsystems 16a–16h, including the physical connection subsystem that transmitted the data to the cross-connect subsystem 18a.

The illustrative cross-connect subsystem 18a is programmed to transfer data from one physical connection subsystem to one forwarding subsystem or to one physical connection subsystem. In this embodiment, this programmed transfer set-up of the cross-connect subsystem is static, i.e., the transfer set-up of the cross-connect subsystem is not dynamically altered as the data frames pass through the data plane.

The cross-connect subsystem 18a advantageously decouples the traditionally strong physical coupling between physical interface subsystems and fast-forwarding subsystems to allow individual SONET payloads to be switched between multiple physical connection subsystems, such as subsystems 16a–16h, and multiple forwarding subsystems, such as subsystems 28a–28e. While the forwarding subsystem 28a performs significant processing of the data frames, the physical connection subsystem 16a provides minimal processing of the frames. That is, the physical connection subsystem 16a is primarily concerned with receiving the data and transmitting it to other subsystems of the network device or to the outside world.

Decoupling of the physical connection subsystems from the forwarding subsystems provides a number of advantages. For example, if one of the illustrative forwarding subsystems 28a–28e is down, the cross-connect subsystem 18a can divert the data destined for that subsystem to one of the other forwarding subsystems. Hence, a malfunction of one or more of the forwarding subsystems does not affect the proper functioning of the physical connection subsystems. Similarly, a malfunction of one or more of the physical connection systems does not affect the proper functioning of the forwarding subsystems.

The device 10 can include one or more forwarding subsystems. One preferred embodiment of the invention includes 20 forwarding subsystems distributed among four quadrants each having five forwarding subsystems. In this illustrative example, the forwarding subsystem 28a receives the SONET payloads from the cross-connect card 18a and transforms them into Asynchronous Transfer Mode (ATM) cell streams. Further, the forwarding subsystem 28a performs stringent Traffic Management functions, such as policing, fair queuing, and shaping. In addition, the forwarding subsystem 28a transmits the ATM cells to a switching fabric 30a.

A forwarding subsystem determines whether a payload (e.g., packets, frames or cells) that it has received includes user payload data or network control information. The forwarding subsystem itself processes certain network control information and sends certain other network control information to the control plane. A forwarding subsystem also generates network control payloads and receives network control payloads from the control plane. A forwarding subsystem sends any user data payloads from a cross-connect subsystem or control information from itself or the control plane as path data to the switch fabric. The switch fabric then passes the path data to one of the forwarding subsystems in any quadrant, including the forwarding subsystem that just sent the data to the switch fabric.

Figure 2B:
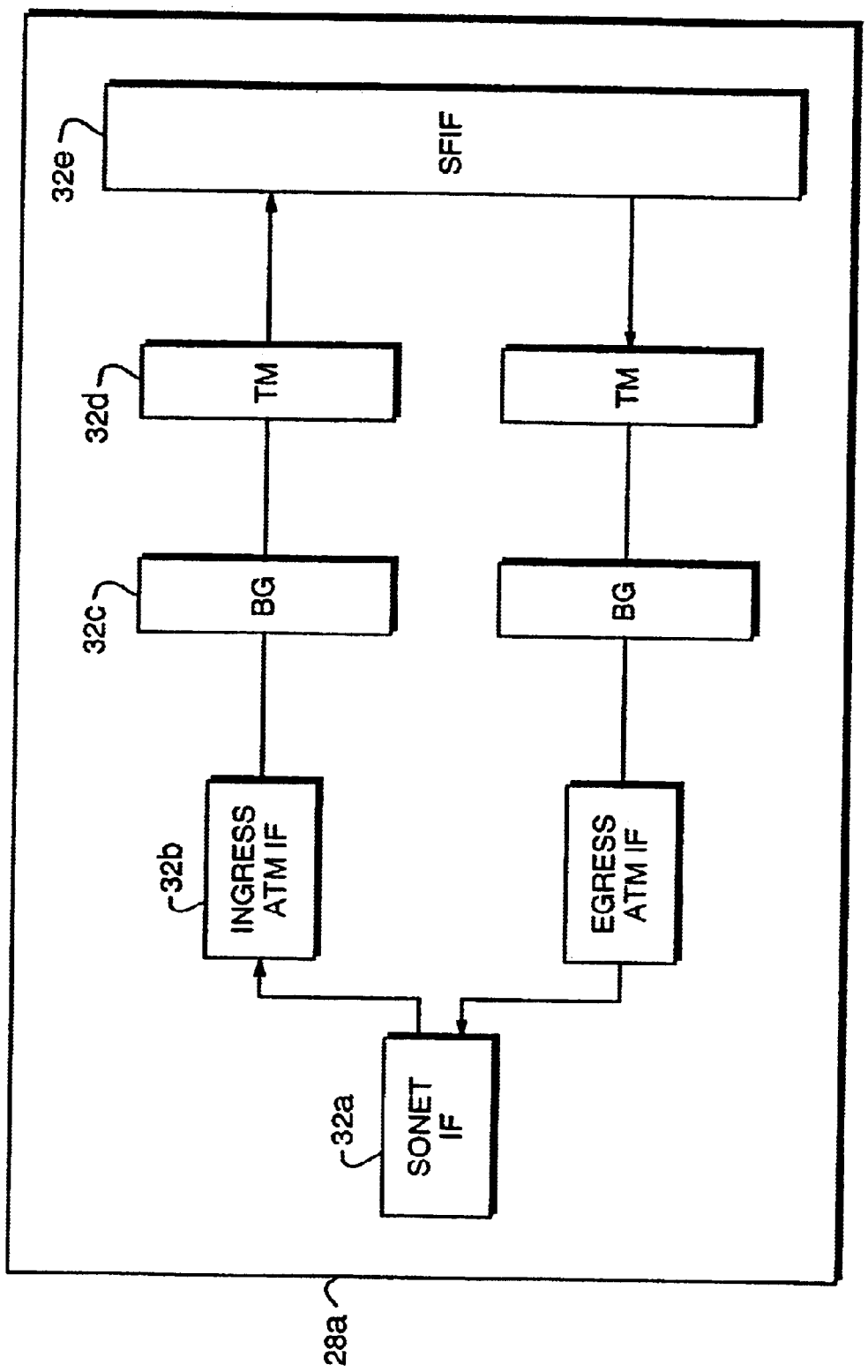
FIG. 2B is a diagram schematically depicting various components of a forwarding subsystem functioning as an ingress component.

With reference to FIG. 2B, the forwarding subsystem 28a includes four payload extractor chips, such as a chip 32a. Each forwarding subsystem (e.g., forwarding subsystem 28a) receives SONET frames over serial lines from the cross-connect subsystem in its quadrant (e.g., cross-connect subsystem 18a) through a payload extractor chip (e.g., the chip 32a). In one embodiment, each forwarding subsystem includes four payload extractor chips where each payload extractor chip represents a slice, and each serial line input represents a forwarding subsystem port. Each payload extractor chip receives four serial line inputs. Since each serial line includes twelve STS-1 time slots, the payload extractor chips combine and separate time slots where necessary to output data paths with the appropriate number of time slots. Each STS-1 time slot may represent a separate data path, or multiple STS-1 time slots may need to be combined to form a data path. For example, an STS-3c path requires a combination of three STS-1 time slots to form a data path while an STS-48c path requires a combination of all forty-eight STS-1 time slots. Each path represents a separate network connection, for example, an ATM cell stream. The payload extractor chip also strips off all vestigial SONET frame information and transfers the data path to an ingress interface chip (ATM IF) (e.g., ATM IF 32b). The ingress interface chip will be specific to the protocol of the data within the path. As one example, the data may be formatted in accordance with ATM protocol and the ingress interface chip is an ATM interface chip (e.g., chip 32b). Other protocols can also be implemented including, for example, Internet Protocol (IP), Multi-Protocol Label Switching (MPLS) protocol or Frame Relay.

The ingress ATM IF chip 32b performs many functions including determining connection information (e.g., virtual circuit or virtual path information) from the ATM header in the payload. The ATM IF chip 32b utilizes the connection information as well as a forwarding table to perform an address translation from the external address to an internal address. The ATM IF chip 32b passes ATM cells to an ingress bridge chip (BG) 32c which serves as an interface to an ingress traffic management chip or chip set (TM) 32d.

The traffic management chip 32d ensures that high priority traffic, for example, voice data, is passed to a switch fabric 30a (FIG. 1) faster than traffic having a lower priority, for example, e-mail data. The traffic management chip 32d may buffer lower priority traffic while higher priority traffic is transmitted, and in times of traffic congestion, the traffic management chip 32d will ensure that low priority traffic is dropped prior to any high priority traffic. The traffic management chip 32d also performs an address translation to add the address of the traffic management chip to which the data will be sent by the switch fabric 30a. The address corresponds to internal virtual circuits set up between forwarding subsystems by software and is available to the traffic management chip 32d in tables.

Referring to both FIGS. 1 and 2B, the traffic management chip 32d sends the ATM cells to a switch fabric interface chips (SFIF) 32e which then transfers the ATM cells to the switch fabric 30a. Each forwarding subsystem can contain a plurality of each of the chips described above, e.g., multiple payload extractor chips, ATM IF chips, and Bridge chips. A slice can contain one of each of these chips. In some embodiments of the network device various slices share some chips, such as the traffic management chip 32d.

The illustrative switching fabric 30a is a 320 Gb, non-blocking fabric that switches the cells between forwarding subsystems. The switch fabric 30a employs the address provided by the ingress traffic management chips to pass ATM cells to the appropriate egress traffic management chips on various forwarding subsystems. In this example, the switching fabric 30a transmits the data received from an ingress forwarding subsystem 28a to an egress forwarding subsystem 34a. The switching fabric can also transmit the received data to the ingress forwarding subsystem. As described above, each forwarding subsystem can serve as either an ingress or egress component. Thus, the switching fabric 30a provides a high degree of flexibility in directing the data between different forwarding subsystems.

The switching fabric 30a switches cells of data dynamically between forwarding subsystems. That is, the switching fabric employs an address in a header provided by the forwarding subsystem that transmits a frame to determine to which forwarding subsystem the cell should be directed. Hence, the routing instructions that the switching fabric 30a employs are not static but can change with each frame that passes through the fabric 30a.

Figure 2C:
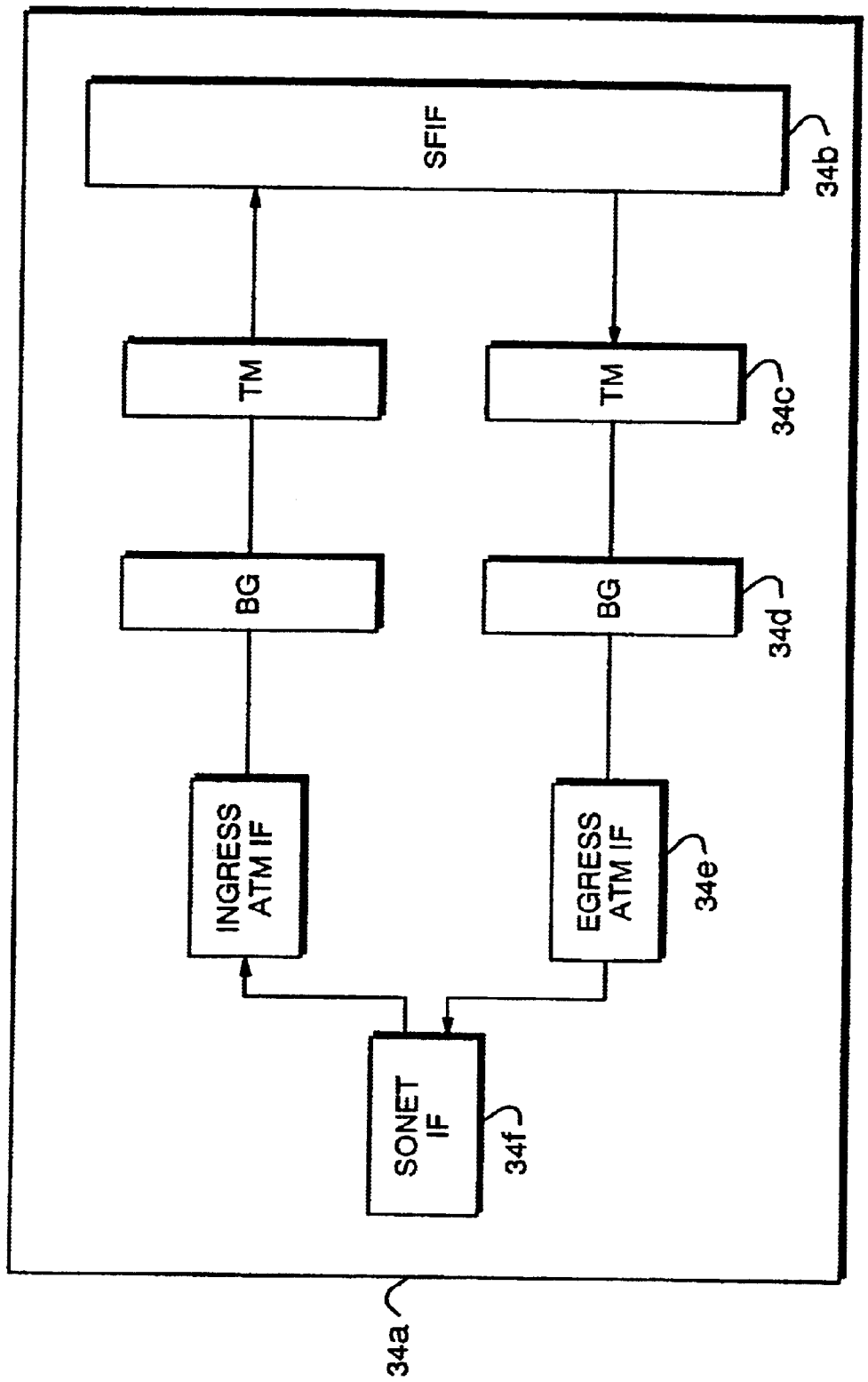
FIG. 2C is a diagram schematically depicting various components of a forwarding subsystem functioning as an egress component.

With reference to FIG. 2C, when the forwarding subsystem 34a receives ATM cells from the switch fabric 30a through a switch fabric interface 34b, egress traffic management chip 34c re-translates the address of each cell and passes the cells to egress bridge chip 34d. The bridge chip 34d passes the cells to an egress ATM interface chip 34e that adds a re-translated address to the payload representing an ATM virtual circuit. The ATM interface chip 34e then sends the data to a payload extractor chip 34f that separates, where necessary, the path data into STS-1 time slots and combines twelve STS-1 time slots into four serial lines and sends the serial lines through a cross-connect subsystem 36a to a particular physical connection subsystem 38a.

A SERDES chip on the physical connection subsystem 38a receives the serial lines and de-serializes the data and sends the data to a SONET framer chip. The framer properly formats the SONET overhead and sends the data to a transceiver that changes the data from electrical to optical before transmitting it to the port 14 and a SONET optical fiber.

Although in the above embodiment, the ports of the physical connection systems were described as being connected to a SONET fiber carrying an OC-48 stream, other SONET fibers carrying other streams (e.g., OC-12) and other types of fibers and cables, for example, Ethernet, may be used instead. The transceivers are standard parts available from many companies, including Hewlett Packard Company and Sumitomo Corporation. The SONET framer may be a Spectra chip available from PMC-Sierra, Inc. in British Columbia. A Spectra 2488 has a maximum bandwidth of 2488 Mbps and may be coupled with a 1×OC-48 transceiver coupled with a port connected to a SONET optical fiber carrying an OC-48 stream also having a maximum bandwidth of 2488 Mbps. Alternatively, four SONET optical fibers carrying OC-12 streams each having a maximum bandwidth of 622 Mbps may be connected to four 1×OC12 transceivers and coupled with one Spectra 2488. In an alternative embodiment, a Spectra 4×155 may be coupled with four OC-3 transceivers that are coupled with ports connected to four SONET fibers carrying OC-3 streams each having a maximum bandwidth of 155 Mbps. Those skilled in the art will appreciate that many other variations are also possible.

A SERDES chip suitable for use in a network device of the invention can be a Telecommunications Bus Serializer (TBS) chip from PMC-Sierra, and each cross-connection subsystem may include a Time Switch Element (TSE) from PMC-Sierra, Inc. Similarly, the SONET interface chips may be MACH 2488 chips and the ATM interface chips may be ATLAS chips both of which are available form PMC-Sierra. Several of the chips used in the network device of the invention are available from Extreme Packet Devices (EPD), a subsidiary of PMC-Sierra, including PP3 bridge chips and Data Path Element (DPE) traffic management chips. The switch fabric interface chips may include a Switch Fabric Interface (SIF) chip from EPD. Switch fabric chips suitable for use in an network device of invention are also available from Abrizio, a subsidiary of PMC-Sierra, including a data slice chip and an Enhanced Port Processor (EPP) chip. A switch fabric of the network device of invention may also include other chips from Abrizio, including a cross-bar chip and a scheduler chip.

Referring again to FIG. 1, the control plane includes internal control devices 40a/40b and external control devices 42a/42b. The network device is a distributed processing system and each internal and external control device has its own dedicated processor subsystem. A processor subsystem can include, for example, one or more processors and memory. Each of the data plane subsystems also have their own dedicated processor subsystems. Providing separate processor subsystems for the internal and external control devices eliminates the need for them to share processing cycles. The internal control device 40a primarily provides control functions for managing the internal resources and events within the network device 10, whereas the external control device 42a primarily provides network management functions related to the external world. For example, the illustrative external control device 42a monitors selected attributes of the external network, such as the configuration/topology of the external network, and the external network traffic. In addition, the external control device 42a communicates with the forwarding subsystems to receive higher level network protocol (i.e., ATM, IP, MPLS) control payloads, for example, Private Network-to-Network Interface (PNNI), Open Shortest Path First (OSPF), and Border Gateway Protocol (BGP). The external control device can also communicate with an external network management system to configure the system in accordance with the instructions of a user.

In contrast, the internal control device 40a can detect faults in the internal components of the network device 10, such as the physical connection subsystems, the forwarding subsystems, the cross-connect subsystems, and the switching fabric; and initiate fail-overs to redundant hardware or restart software processes. Further, the internal control device 40a can detect newly added hardware within the device, configure and re-configure hardware and software within the device, upgrade and downgrade software processes, provide fault analysis of selected subsystems of the network device, and gather data relevant to networking accounting and statistics. In addition, the internal control device 40a can initialize and reset the subsystems in the data plane.

Figure 3A:
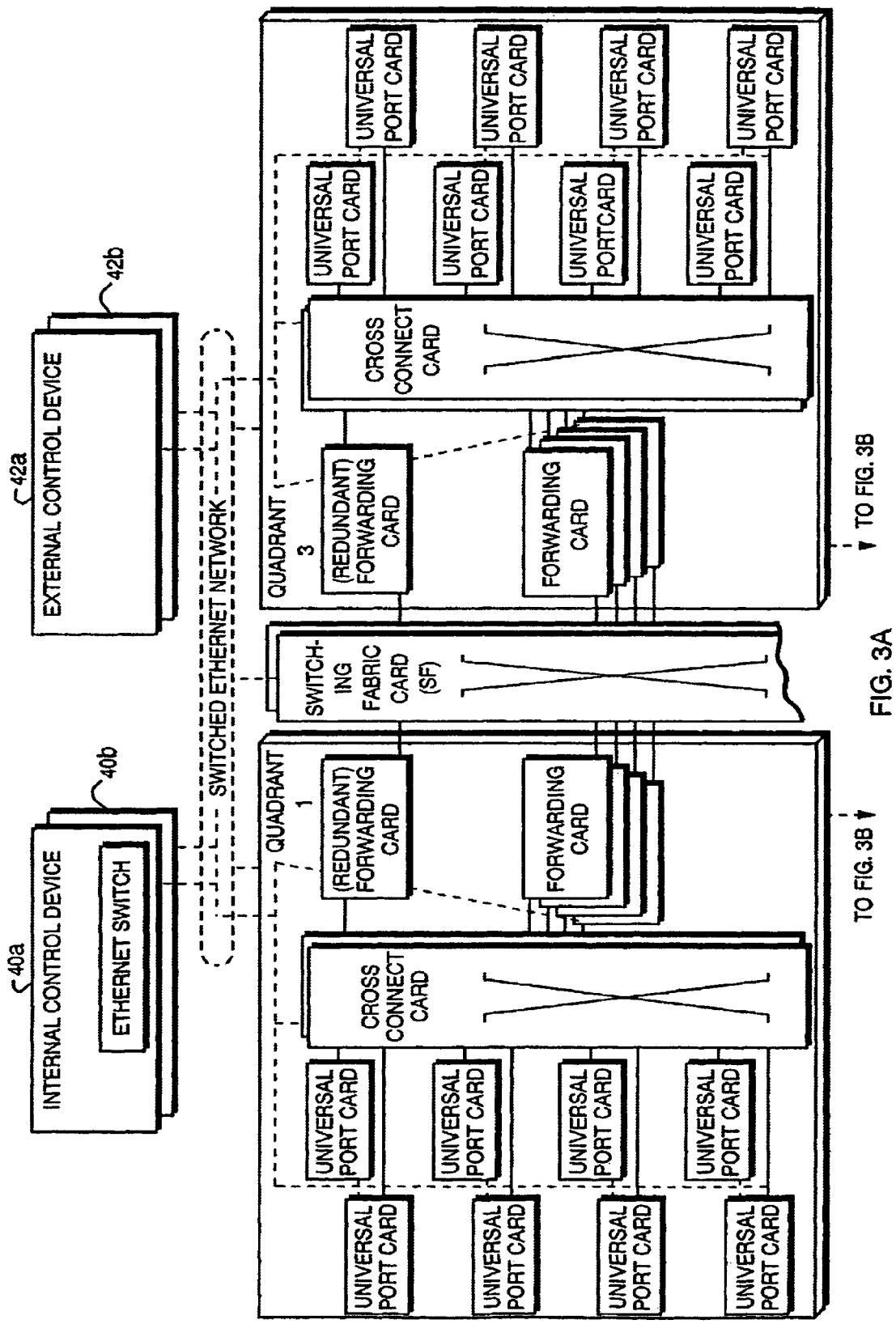
FIG. 3 is a diagram schematically depicting a preferred architecture of a network device of the invention, and FIG. 4 schematically illustrates a network of a plurality of computer switches.
Figure 3B:
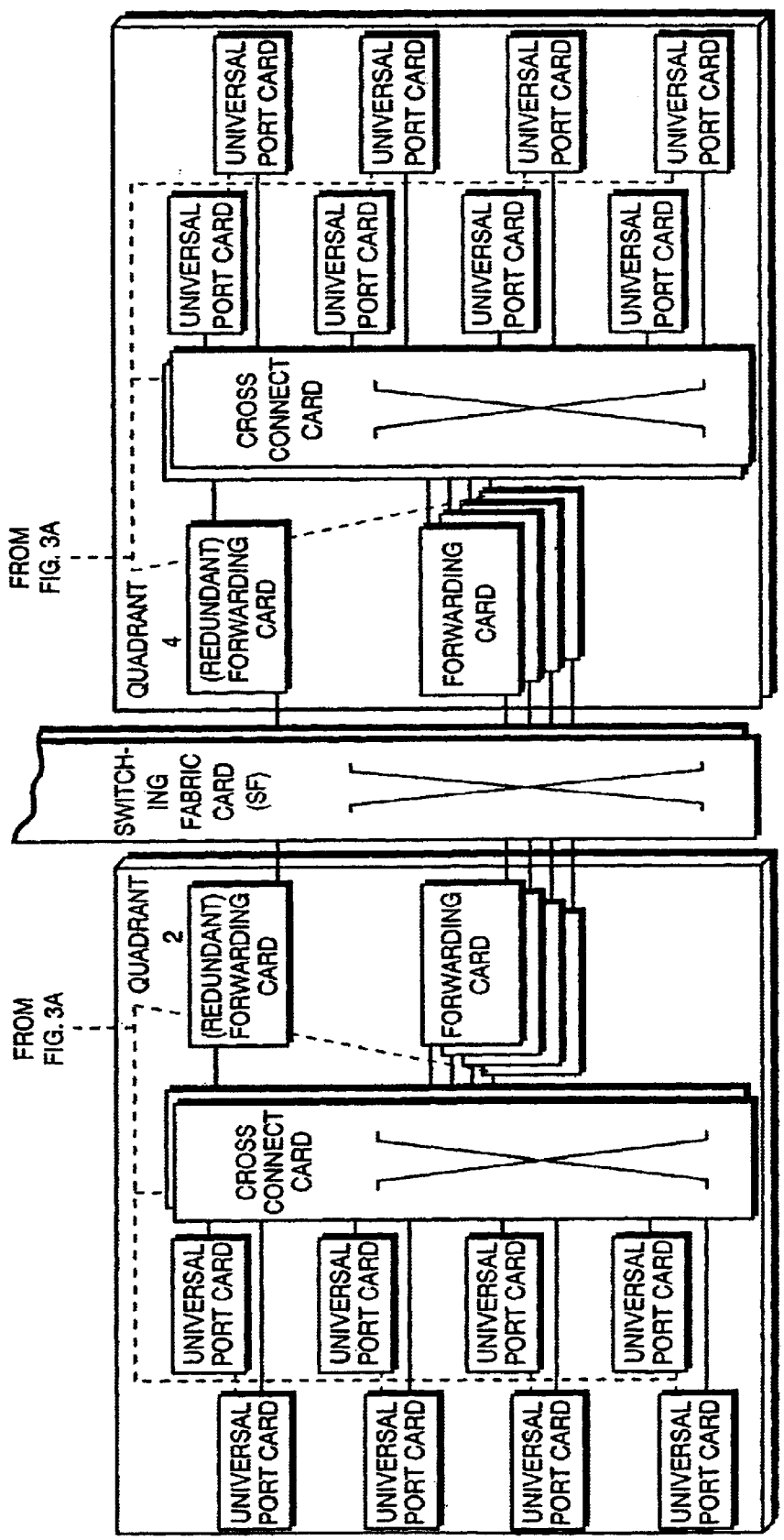

A network device of the invention can have one or more internal control devices, and one or more external control devices. With reference to FIG. 3, one preferred embodiment of the network device of the invention includes four quadrants 1–4, each having 8 physical connection subsystems, 5 forwarding subsystems, and two cross-connect subsystems. Two switching fabrics 30a–30b transfer data cells between forwarding subsystems. This embodiment includes two internal control devices 40a and 40b, and two external control devices 42a and 42b. The presence of multiple internal and external control devices advantageously allows employing one or more of the external control and/or internal control devices as back-up devices in case of a fault in the primary external or internal control device.

In the illustrative embodiment, one active internal control device 40a and one active external control device 40b manage the four quadrants 1–4. As the number of network connections grow, it may be desirable to provide additional internal and external network devices such that each quadrant is managed (or two quadrants are managed) by a separate pair of external and internal network devices. Moreover, additional external and internal network devices can be provided to allow the network device 10 to handle different network protocols simultaneously. For example, some of the forwarding subsystems can be configured to handle one protocol, e.g., ATM, while other forwarding subsystems handle another protocol, e.g., IP or MPLS. One pair of internal and external control devices can be provided to manage the forwarding subsystems handling one protocol, and a separate pair of internal and external control devices can be provided to manage the forwarding subsystems handling another protocol.

The internal and external control subsystems 40a and 40b can employ a message based communication bus, such as an Ethernet, token ring, or any proprietary bus, to communicate with each other and with the subsystems of the data plane. In addition, the subsystems of data plane can employ such communication buses to communicate with each other and with the control plane. For example, with continued reference to FIG. 1, the illustrative internal control subsystem 40a employs an Ethernet switch 44 to communicate via an Ethernet bus 46 with the physical connection subsystems, the cross-connect subsystems, the forwarding subsystems, and the switching fabrics in the data plane. Further, an Ethernet connection is provided via the Ethernet switch 44 and the Ethernet bus 46 between the internal control device 40a and the external control device 40b. This Ethernet connection between the internal control device 40a and the external control device 42a not only allows the external control device 42a to transmit data to and receive data from the internal control device 40a, but it also allows communication between the external control device 42a and the data plane.

The installation of the Ethernet switch 44 on the internal control device 40a rather than on the external control device 42a provides a number of advantages. In particular, an external control device is typically more likely to run complex software and/or third party software, and hence is more susceptible to failure than an internal control device. Thus, placing Ethernet switch 44 on the internal control device 40a allows continued communication between the internal control device and the data plane even if the external control device is down. It also allows the various subsystems in the data plane, such as the forwarding subsystems, to continue communicating with each other. One skilled in the art will understand, however, that the Ethernet switch can be placed on the external control device or on another subsystem. Similarly, a shared Ethernet bus may be employed rather than a switched Ethernet bus, or another type of communications bus may be used instead of Ethernet.

In traditional network devices, a single control subsystem performs management tasks related to both the internal resources of the device and the external environment. In such traditional devices, processing time is shared between internal and external management tasks. This sharing of processing cycles can lead to a number of problems. For example, a competition for processing time can ensue if the performance of a task related to the external world coincides with a task related to the internal management of the device. For example, an internal processor subsystem may be replaced or added while a new network device is added to the external network. In such a situation, the control system must ensure that the new topology of the external network is recognized by the network device as soon as possible to avoid a situation where multiple network devices in the external network have a different understanding of the external network topology. In addition, the control system must also attend to initializing the added processor subsystem as soon as possible since the addition of internal resources may be directed to alleviating congestion or to fix an internal fault. In a traditional device, these tasks are accomplished by a time sharing of processing cycles, which can lead to delays in performing both tasks. Such delays can have adverse effects on the performance of both the network device and the external network. For example, such delays can decrease the rate of data transmission through the external and/or the internal networks. Where different network devices have different understandings of the external network topology, the entire network may become unstable and crash. Further, in traditional network devices, in which the same subsystem performs internal and external control functions, an internal fault may be propagated to the external network and lead to instability and perhaps a network crash.

The division of the tasks between the internal control device and the external control device of the network device of the invention provides a number of distinct advantages over traditional network architectures by solving various shortcomings of traditional network architectures, such as those delineated above. For example, the occurrence of an internal fault in an internal subsystem of the network device of the invention is handled by the internal network device, and is hence contained within the network device and does not affect the interaction of the outside world, e.g., other network switches, with the network device. This prevents internal faults from creating instability and faults in the external network.

For example, with reference to FIG. 1, if a fault occurs in one of the forwarding subsystems 28a–28e, the fault is detected by the internal control device 40a which initiates selected fault analysis algorithms to isolate the problem and correct it. Correction may include re-starting processes or resetting processes or subsystem hardware, or re-booting the subsystem. The external control device 42a, however, does not participate in such internal fault analysis nor is it made aware of the internal fault. Hence, the outside world that interfaces with the network device 10 through the external control device 42a is not aware of or affected by the internal fault. Further, the fault analysis performed by the internal control device 40a does not slow down the processing speed of the external control device 42a because the two devices do not share processing cycles. Hence, if an external network event has occurred, the external control device is able to dedicate all of its processor resources to that event regardless of the internal events being handled by the internal control device. In addition, where an internal fault is detected by the internal control device and recovery processes are initiated on one forwarding subsystem, the other forwarding subsystems can continue to pass control data to the external control device.

Another advantage of the network device of the invention is that problems associated with an external environment (e.g., a network of switches) are not likely to cause disruption in proper functioning of the internal subsystems of the device. For example, in a network of traditional switches, a faulty switch may be broadcasting rapidly changing information to other switches. All switches must quickly react to any changes in the network topology or configuration and must all Aconverge@ to an identical view of the external network to allow a proper functioning of the network. In a situation where a switch is broadcasting rapidly changing information, the network elements may never arrive at a steady state identical view of the network. Meanwhile, the control processor of each switch has to perform large mathematical calculations which utilize a large portion of processing cycles and memory. This may starve internal control systems for processing cycles, and falsely create an internal fault. The falsely created internal fault can in turn lead to initiation of internal fault isolation algorithms with concomitant use of processing cycles and hardware and software reconfiguration. This can exacerbate the external problem, and spiral into instability at all levels and collapse of the entire network.

In contrast, the internal subsystems of the network device of the invention can continue to function properly even if there is some instability in the external network, which may eventually correct itself or be corrected with intervention. Further, it is possible to have a complete collapse of certain protocols, for example, IP, BGP or OSPF, without affecting others, for example, ATM and PNNI.

Another advantage of the architecture of the network device of the invention is that hardware and/or software upgrades can be implemented more reliably and more efficiently than in traditional network devices. For example, it may be desirable or necessary to provide frequent software upgrades for applications running on the external control device 42a. For example, the processors on the external control device can be replaced with improved/faster integrated circuit processing chips (e.g., Motorola 8260 and Pentium processors of Intel corporation) that are released periodically. Such upgrades of the external control device may be implemented while the network device is still running without affecting the other parts of the device, such as the internal control device 40a.

Similarly, internal software upgrades and/or changes to the internal configuration of the network device can be accomplished independent of the external control device 42a. A modular software architecture allows effectuating such upgrades and changes efficiently. This advantageously simplifies reliability testing of the device, and allows for better fault isolation.

Typically, software or hardware changes are accomplished at a customer=s site while the system is running within pre-defined time periods. In traditional systems, problems that arise during such a change must be solved within the allotted time. Otherwise, the change must be aborted and tried at a different time to prevent an instability of the entire network. In a device according to the invention, the outside environment interfaces with the external control device, and hence is typically not aware of internal changes in the device. This allows implementing software and hardware changes more rapidly, and further allows solving problems that may arise during such changes more efficiently. This results in fewer minutes of downtime per year, thus resulting in higher degree of availability of the network device.

Figure 4:
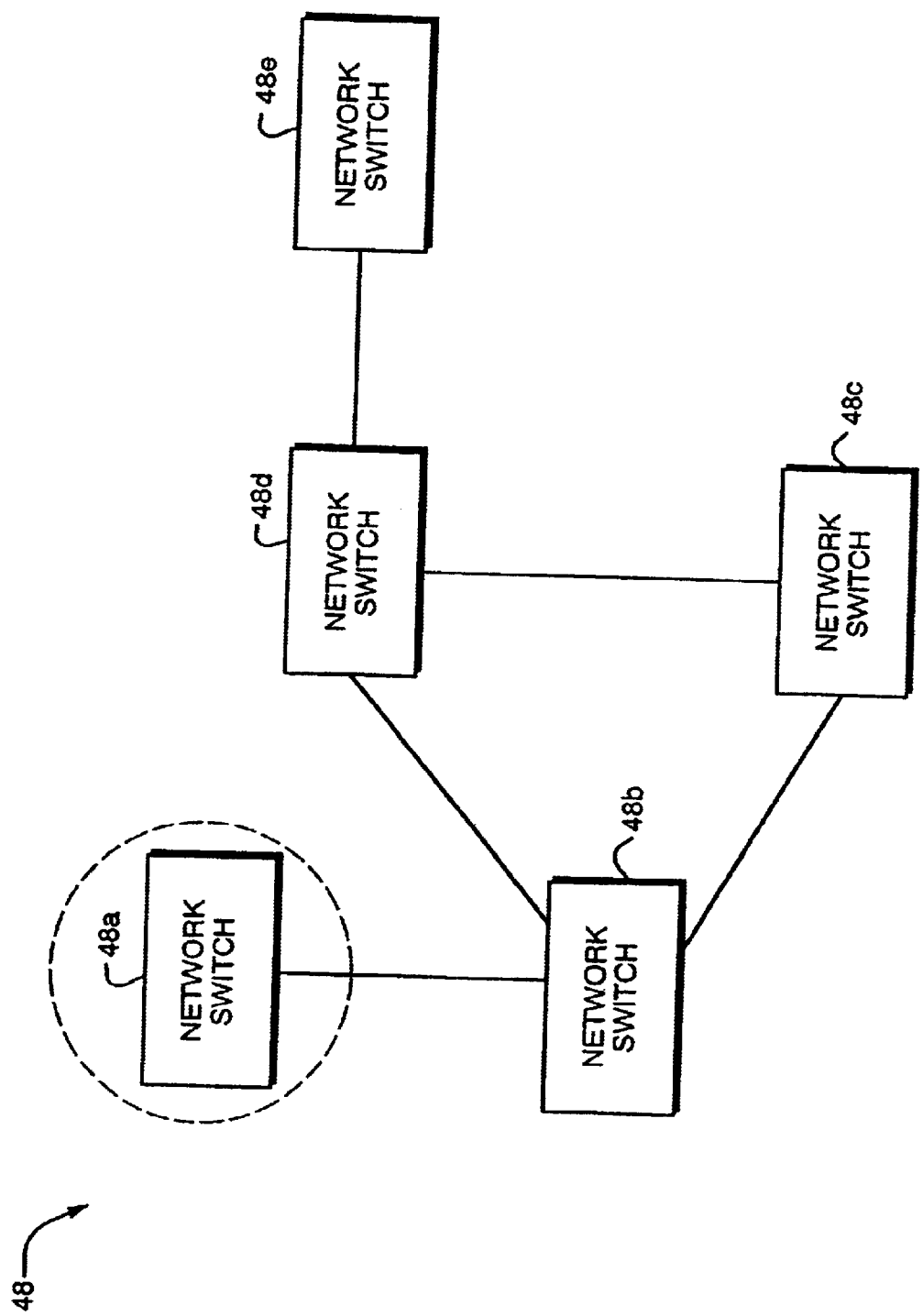

Thus, the network device of the invention provides a high degree of modularity in that the internal configuration of the device can be modified without affecting the external network environment. Reference to FIG. 4 may better illustrate this distinct advantage of the switch of the invention. FIG. 4 schematically illustrates an exemplary computer network 48 having a number of traditional network switches 48a–48e which are connected to each other in a selected topological pattern. A software upgrade in the switch 48a may cause a fault that may result in an instability in the switch 48a. For example, the software may include undetected problems, i.e., bugs, or the upgrade may cause other software or hardware to develop problems. In addition, human error in installing new processing cards may result in a fault in the system, and hence an instability of the switch. Such an instability in the traditional switch 48a may be passed to the other switches in the network, and can slow down the network traffic, or even cause an outage of the entire network. In fact, the majority of network outages are directly attributable to software upgrade issues and software quality in general or hardware failures which were propagated to the external network rather than being identified as failures and isolated internally.

In contrast, an internal fault in a switch according to the teachings of the invention is transparent to the other switches in the network and not propagated to the external network, and hence is not likely to cause an outage of the network.

Traditionally, network device designers attempt to provide the highest data processing capability by employing as few components as possible to save space and to minimize the cost of manufacturing. In other words, traditional network designs are typically concerned with maximizing service density. Service density refers to the proportionality between the net output of a particular device and its gross hardware capability. Net output of a network device, e.g., a switch or a router, may include, for example, the number of calls handled per second. Providing redundancy in the components of the network device and/or providing a highly distributed processing environment add to the gross hardware capability without increasing the net output, i.e., it decreases the service density.

The architecture of a network device according to the invention deviates from conventional paradigms in the design of network devices in that it provides a highly distributed architecture having a high degree of redundancy. Such an architecture may require more complex hardware and software design, and may therefore require additional development time. However, the network device of the invention provides significantly increased reliability and availability relative to traditional network devices. In particular, the increased reliability of the network device of the invention can substantially reduce the likelihood of a network outage.

It will be understood that variations and modifications of the above described methods and apparatuses will be apparent to those of ordinary skill in the art and may be made without departing from the inventive concepts described herein. Accordingly, the embodiments described herein are to be viewed merely as illustrative, and not limiting, and the invention are to be limited solely by the scope and spirit of the appended claims.

What is claimed is:

1. A computer network device, comprising
 a data plane having a plurality of subsystems for transmitting data between a receiving port and a transmitting port, and
 a control plane in communication with said data plane, said control plane
 comprising
  an internal control device in communication with said plurality of subsystems for managing internal resources and events within said network device, and
  an external control device in communication with said internal control device and said plurality of subsystems for receiving control information regarding an external environment for managing operations relating to interfacing of said network device with said external environment,
 wherein said internal control device and said external control device have separate processors.

2. The computer network device of claim 1, wherein said external control device monitors control information regarding at least one of topology, configuration, and data traffic flow through said external environment.

3. The network device of claim 1, wherein said internal control device can perform at least one of detecting faults in internal components of the network device, initiating failovers to redundant hardware of the network device, restarting software processes, detecting newly added hardware, configuring and reconfiguring hardware and software within the device, upgrading and downgrading software processes, providing fault analysis of selected subsystems of the network device, gathering data relevant to networking accounting and statistics, and initializing and resetting selected subsystems in the data plane.

4. The network device of claim 1, wherein said network device is a network switch.

5. The network device of claim 1, wherein said network device is a router.

6. The network device of claim 1, wherein said network device is a hybrid switch-router.

7. The network device of claim 1, wherein said network device includes a message based communication bus for providing communication between said internal control device and said data plane and for providing communication between said internal control device and said external control device.

8. The network device of claim 7, wherein said message based communication bus comprises an Ethernet bus and said internal control device employs an Ethernet switch.

9. The network device of claim 7, wherein said message based communication bus comprises an Ethernet bus and said external control device employs an Ethernet switch.

10. The network device of claim 7, wherein said message based communication bus includes a token ring protocol.

11. The network device of claim 7, wherein said message based communication bus comprises a switched bus.

12. The network device of claim 1, wherein said network device includes a shared communication bus for providing communication between said internal control device and said data plane and for providing communication between said internal control device and said external control device.

13. The network device of claim 1, wherein said external control device further includes an interface between the network device and said external environment.

14. The network device of claim 1, wherein said external environment comprises a network of computers and said external control device monitors topology of the external network of computers.

15. The network device of claim 1, wherein said external control device communicates with said data plane to receive network protocol control payloads.

16. The network device of claim 15, wherein said network protocol is selected from the group consisting of ATM, IP, MPLS and FR.

17. The network device of claim 1, wherein the data plane comprises
 a physical connection subsystem for receiving data from and transmitting data to a physical layer,
 a forwarding subsystem in communication with said physical connection subsystem for processing the data, and
 a cross-connect subsystem for providing communication between said physical connection subsystem and said forwarding subsystem.

18. The network device of claim 17, wherein said physical connection subsystem and said forwarding subsystem have separate processor subsystems.

19. The network device of claim 17, wherein said physical connection subsystem includes a port for receiving optical data transmitted on an optical fiber.

20. The network device of claim 17, wherein said physical connection subsystem includes a SONET interface logic for transforming said optical data to electrical signals.

* * * * *